(12) United States Patent
Murano

(10) Patent No.: US 8,193,910 B2
(45) Date of Patent: Jun. 5, 2012

(54) INTERROGATOR, TRANSPONDER AND TRANSPONDER IDENTIFICATION METHOD

(75) Inventor: Tomomitsu Murano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 918 days.

(21) Appl. No.: 11/504,591

(22) Filed: Aug. 16, 2006

(65) Prior Publication Data

US 2007/0200677 A1 Aug. 30, 2007

(30) Foreign Application Priority Data

Feb. 10, 2006 (JP) ................................. 2006-034192

(51) Int. Cl.
*H04Q 5/22* (2006.01)

(52) U.S. Cl. ..................... 340/10.1; 340/10.2; 340/10.3; 340/10.4; 340/572.1; 340/3.41; 340/539.1; 340/13.26

(58) Field of Classification Search ........ 340/10.1–10.6, 340/3.51
See application file for complete search history.

(56) References Cited

U.S. PATENT DOCUMENTS

| | | | | |
|---|---|---|---|---|
| 5,530,702 | A * | 6/1996 | Palmer et al. ................. | 370/445 |
| 5,751,570 | A * | 5/1998 | Stobbe et al. .................. | 700/11 |
| 6,044,063 | A * | 3/2000 | Kolagotla et al. ............. | 370/241 |
| 6,130,602 | A * | 10/2000 | O'Toole et al. ............. | 340/10.33 |
| 6,157,633 | A * | 12/2000 | Wright ........................... | 370/349 |
| 6,480,108 | B2 * | 11/2002 | McDonald .................... | 340/505 |
| 6,538,563 | B1 * | 3/2003 | Heng ........................... | 340/10.2 |
| 6,566,997 | B1 * | 5/2003 | Bradin ......................... | 340/10.2 |
| 6,661,350 | B1 * | 12/2003 | Rohrberg et al. ........... | 340/12.28 |
| 6,724,297 | B1 | 4/2004 | Vacherand et al. .......... | 340/10.3 |
| 6,727,803 | B2 | 4/2004 | Hulvey | |
| 7,312,692 | B2 * | 12/2007 | Friedrich ..................... | 340/10.1 |
| 7,315,522 | B2 * | 1/2008 | Wood, Jr. ..................... | 370/312 |
| 7,365,636 | B2 * | 4/2008 | Doi et al. .................... | 340/10.4 |
| 7,420,466 | B2 * | 9/2008 | Shafer ......................... | 340/572.1 |
| 2003/0052161 | A1 * | 3/2003 | Rakers et al. ................ | 235/375 |

(Continued)

FOREIGN PATENT DOCUMENTS

JP 11-272815 10/1999

(Continued)

OTHER PUBLICATIONS

Japanese Office Action dated Feb. 23, 2010, with partial English translation.

(Continued)

*Primary Examiner* — Daniel Wu
*Assistant Examiner* — Ryan Sherwin
(74) *Attorney, Agent, or Firm* — Kratz, Quintos & Hanson, LLP

(57) ABSTRACT

There is provided an interrogator, transponder, and transponder identification method, which shorten processing time for identification. An interrogator that makes wireless communication with a transponder, comprising: a temporary number specify section that transmits a request for transmission of a unit bit string as a bit string having a predetermined length in a bit string expressing a temporary number owned by the transponder, receives a unit bit sting transmitted from the transponder in response to the request, and specifies the temporary number of the transponder, based on the unit bit string; and an identification information obtaining section that transmits, if a temporary number of a transponder is specified by the temporary number specify section, a request for transmission of identification information of the transponder to the transponder, and receives the identification information transmitted from the transponder, in response to the request.

17 Claims, 9 Drawing Sheets

U.S. PATENT DOCUMENTS

| | | | | |
|---|---|---|---|---|
| 2004/0012486 A1* | 1/2004 | Mani | .............................. | 340/10.2 |
| 2004/0066279 A1* | 4/2004 | Hughes et al. | ................ | 340/10.1 |
| 2004/0223481 A1* | 11/2004 | Juels et al. | .................... | 370/345 |
| 2006/0181395 A1* | 8/2006 | Gruszynski | ................ | 340/10.51 |
| 2006/0290473 A1* | 12/2006 | Mahasenan et al. | .......... | 340/10.2 |

FOREIGN PATENT DOCUMENTS

| | | |
|---|---|---|
| JP | 2000-131423 | 5/2000 |
| JP | 2007-074216 | 3/2007 |
| WO | WO 99/43127 | 8/1999 |
| WO | WO 02/097708 A2 | 12/2002 |

OTHER PUBLICATIONS

Bonuccelli M A et al: "Tree Slotted Aloha: a New Protocol for Tag Identification in RFID Networks" World of Wireless, Mobile and Multimedia Networks, 2006. WOWMOM 2006. International Symposium on a Buffalo-Niagara Falls, NY, USA Jun. 26-29, 2006, Piscataway, NJ, USA, IEEE, Jun. 26, 2006, pp. 603-608, XP010925927 ISBN: 978-0-7695-2593-8.

European Search Report dated Jul. 2, 2009.

* cited by examiner

INTERROGATOR, TRANSPONDER AND TRANSPONDER IDENTIFICATION METHOD

BACKGROUND OF THE INVENTION

1. Field of the Invention

The present invention relates to an interrogator, transponder, and transponder identification method, to identify the transponder in communication between the interrogator and the transponder.

2. Description of the Related Art

Identification (ID identification) processing to identify transponders is executed in a system such as a RFID (Radio Frequency Identification) system or an IC (Integrated Circuit) card system, in which data is transmitted/received via wireless communication between plural transponders (a transponder, tag, IC card, etc.) and interrogators (an interrogator, reader/writer, R/W, etc.)

If plural transponders are given with respect to one interrogator, all the transponders respond at once together to an identification command from the interrogator. This results in a problem that radio signals collide with each other so that the interrogator is unable to receive any response.

International standard ISO-18000 part 6 is an identification scheme with anti-collision.

Of the ISO-18000 part 6, Type A is a random number time division scheme which is called a slot ALOHA method. Operation of the Type A will be described below. In response to an identification command from an interrogator, a transponder generates a random number, and sends an ID to a slot corresponding to the value. If the ID is received successfully, the interrogator notifies the transponder of a receipt response signature. If the transponder fails to receive the signature (i.e., a collision is detected), the transponder generates a random number again and sends the ID after waiting a time corresponding to the value.

Meanwhile, Type B of the ISO-18000 part 6 is a random number state transition scheme. Operation of the Type B will be described below. Each transponder has a timer counter and responds to an identification command from an interrogator only when the timer counter counts zero. If a interrogator fails to receive the response (i.e., a collision is detected), the interrogator notifies corresponding transponders of this failure. Those transponders that have responded just before and have received the acknowledgement of this failure generate a random number ("0" or "1"). Of the transponders, those that have generated "0" send the ID again while the others that have generated "1" let the timer counters count up.

An address bit transfer scheme is a kind of identification processing scheme with ant-collision noted above (for example, see U.S. Pat. No. 6,727,803). Response devices send IDs by use of slots which deal with IDs in units of bits. A interrogator receives one or both of "0" and "1". If the interrogator receives one of "0" and "1", the interrogator requests transfer of a next bit from the transponder which sends the received one of "0" and "1". Otherwise, if the interrogator receives both of "0" and "1", for example, the interrogator prioritizes "1" and requests transfer of a next bit from the transponder which sends the received "1". In addition, the interrogator stacks the received "0" on a bit string in which previously received bits are arrayed.

However, in the random number time division scheme and the random number state transition scheme, the transponders decide whether a response is possible or not according to the random numbers. Therefore, if a large number of transponders are provided, the collision rate rises. Meanwhile, in the slot ALOHA method, if only a small number of transponders are provided, the response period is fixed depending on the number of slots, resulting in a problem of low efficiency.

The address bit transfer scheme noted above is an efficient search scheme which avoids collision by use of uniqueness of IDs. According to this scheme, however, ID lengths have to be searched for regardless of the number of transponders. A problem hence arises in that the identification processing takes a long time. For example, if two transponders are provided, ID lengths such as 96 bits, 128 bits, and the like have to be searched for.

SUMMARY OF THE INVENTION

The present invention has been made to address the above problems, and provides an interrogator, transponder, and transponder identification method which shorten the processing time in identification.

According to the present invention to address the above problems, there is provided an interrogator that makes wireless communication with a transponder, comprising: a temporary number specify section that transmits a request for transmission of a unit bit string as a bit string having a predetermined length in a bit string expressing a temporary number owned by the transponder, receives a unit bit string transmitted from the transponder in response to the request, and specifies the temporary number of the transponder, based on the unit bit string; and an identification information obtaining section that transmits, if a temporary number of a transponder is specified by the temporary number specify section, a request for transmission of identification information of the transponder to the transponder, and receives the identification information transmitted from the transponder, in response to the request.

In the interrogator according to the present invention, the temporary number specify section receives plural kinds of unit bit strings transmitted from the transponder, distinguishing the plural kinds of unit bit strings from one another.

Also in the interrogator according to the present invention, the temporary number specify section stores received unit bit strings connected with one another, as a temporary number bit string.

Also in the interrogator according to the present invention, if plural kinds of unit bit strings are received from a transponder, the temporary number specify section transmits a multi-reception acknowledgement to the transponder, the acknowledgement acknowledging reception of the plural kinds of unit bit strings.

Also in the interrogator according to the present invention, if plural kinds of unit bit strings are received from a transponder, the temporary number specify section decides priority order of the plural kinds of the unit bit strings, based on preset priority order of the unit bit strings, stores, as a temporary number stack, the temporary number bit string added with another unit bit string than the most prioritized unit bit string among the plural kinds of unit bit strings, and stores, as a new temporary number bit string, the temporary number bit string added with the most prioritized unit bit string among the plural kinds of unit bit strings.

Also in the interrogator according to the present invention, if identification information of a transponder is received by the identification information obtaining section and if any bit string whose temporary number has not yet been specified exists still in the temporary number stack, the temporary number specify section specifies a new temporary number, using the newest bit string in the temporary number stack as a temporary number bit string.

Also in the interrogator according to the present invention, the temporary number is shorter information than the identification information.

Further, according to the present invention, there is provided a transponder that makes wireless communication with an interrogator, comprising: a temporary number generation section that generates a temporary number; a unit bit string transmitter that transmits, if a request for transmission of a unit bit string as a bit string having a predetermined length in a bit string of a temporary number, the unit bit string; and an identification information transmitter that transmits, if a request for transmission of identification information is received from the interrogator, the identification information to the interrogator.

In the transponder according to the present invention, if the unit bit string transmitter receives a multi-reception acknowledgement from the interrogator, the acknowledgement acknowledging that plural kinds of unit bit strings have been received, the unit bit string transmitter performs setting of a queue counter, based on a unit bit string transmitted just before and based on preset priority order of unit bit strings.

Also in the transponder according to the present invention, the unit bit string transmitter receives a multi-reception acknowledgement or a request for transmission of a next unit bit string, from the interrogator, and transmits the next unit bit string if the queue counter indicates zero.

Also the transponder according to the present invention, the unit bit string transmitter performs transmission, using a slot corresponding to the unit bit string.

Also the transponder according to the present invention, the temporary number is shorter information than the identification information.

Further, according to the present invention, there is provided a transponder identification method by which identification of a transponder is performed by wireless communication between an interrogator and the transponder, comprising: a temporary number generation step of the transponder that generates a temporary number; a unit bit string request transmission step of the interrogator that transmits a request for transmission of a unit bit string as a bit string having a predetermined length in a bit string of a temporary number owned by the transponder, a unit bit string transmission step of the transponder that transmits the unit bit string if the request transmitted by the temporary number request step is received; a temporary number specify step of the interrogator that receives the unit bit string transmitted by the temporary number transmission step, and specifies the temporary number of the transponder, based on the unit bit string; an identification information transmission request transmission step of the interrogator that transmits a request for transmission of identification information of the transponder to the transponder if the temporary number of the transponder is specified by the temporary number specify step; an identification information transmission step of the transponder that transmits the identification information to the interrogator if the request transmitted by the identification information request step is received; and an identification information reception step of the interrogator that receives the identification information transmitted by the identification information transmission step.

In the transponder identification method according to the present invention, the temporary number specify step receives plural kinds of unit bit strings, distinguishing the plural kinds of unit bit strings from one another.

Also in the transponder identification method according to the present invention, the temporary number specify step stores received unit bit strings connected with one another, as a temporary number bit string.

Also in the transponder identification method according to the present invention, if plural kinds of unit bit strings are received from a transponder, the temporary number specify step transmits a multi-reception acknowledgement to the transponder, the acknowledgement acknowledging reception of the plural kinds of unit bit strings.

Also in the transponder identification method according to the present invention, if plural kinds of unit bit strings are received from a transponder, the temporary number specify step decides priority order of the plural kinds of the unit bit strings, based on preset priority order of the unit bit strings, stores, as a temporary number stack, the temporary number bit string added with another unit bit string than the most prioritized unit bit string among the plural kinds of unit bit strings, and stores, as a new temporary number bit string, the temporary number bit string added with the most prioritized unit bit string among the plural kinds of unit bit strings.

Also in the transponder identification method according to the present invention, if identification information of a transponder is received by the identification information obtaining step and if any bit string whose temporary number has not yet been specified exists still in the temporary number stack, the temporary number specify step is executed again to specify a new temporary number, using the newest bit string in the temporary number stack as a temporary number bit string.

Also in the transponder identification method according to the present invention, if the unit bit string transmission step receives a multi-reception acknowledgement from the interrogator, the acknowledgement acknowledging that plural kinds of unit bit strings have been received, the unit bit string transmission step performs setting of a queue counter, based on a unit bit string transmitted just before and based on preset priority order of unit bit strings.

Also in the transponder identification method according to the present invention, the unit bit string transmission step receives a multi-reception acknowledgement or a request for transmission of a next unit bit string, from the interrogator, and transmits the next unit bit string if the queue counter indicates zero.

Thus, according to the present invention, the transponder decides a temporary number, and the temporary number is transmitted for every unit bit string. The transponder and the interrogator both determine priority order. As a result, processing time for identification is shortened.

DETAILED DESCRIPTION OF THE PREFERRED EMBODIMENTS

Embodiments of the present invention will now be described with reference to the drawings.

First Embodiment

Outline of a wireless communication system according to the present embodiment will now be described.

Figure 1:
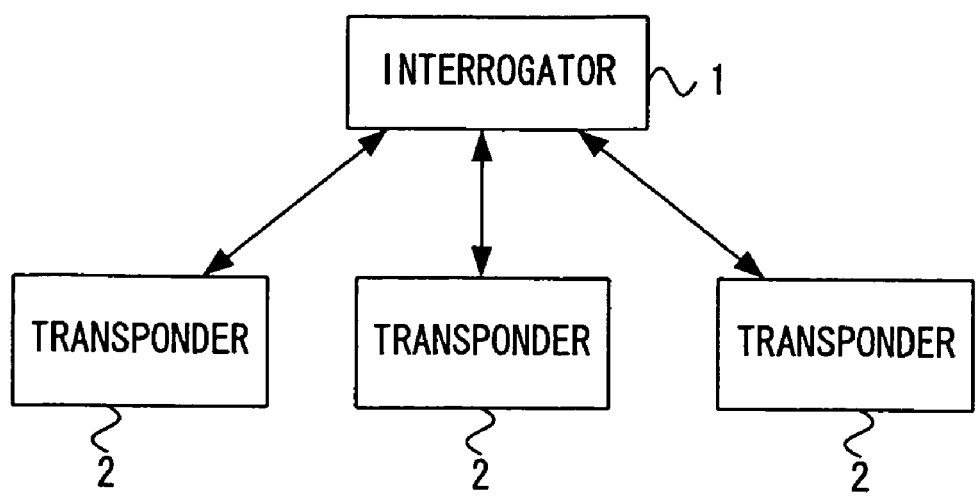
FIG. 1 is a block diagram showing an example of configuration of a wireless communication system according to the first embodiment.

FIG. 1 is a block diagram showing an example of configuration of the wireless communication system according to the present embodiment. This wireless communication system has an interrogator 1 and plural transponders 2.

Figure 2:
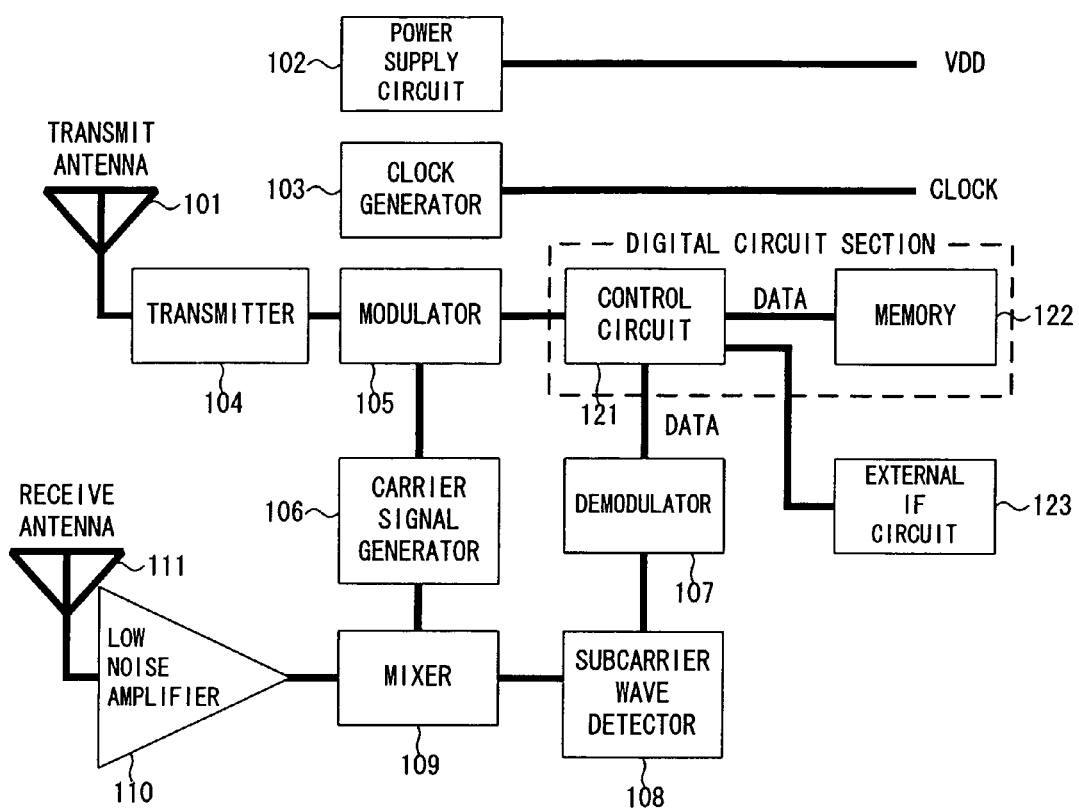
FIG. 2 is a bock diagram showing an example of structure of an interrogator according to the first embodiment.

Described next will be outline of the interrogator 1. FIG. 2 is a block diagram showing an example of configuration of the interrogator according to this embodiment. The interrogator 1 has a transmit antenna 101, a power supply circuit 102, a clock generator 103, a transmitter 104, a modulator 105, a carrier wave generator 106, a demodulator 107, a subcarrier wave detector 108, a mixer 109, a low noise amplifier 110, a receive antenna 111, a control circuit 121, a memory 122, and an external IF (Interface) circuit 123. The power supply circuit 102 supplies respective circuits with power. The clock generator 103 supplies respective circuits with a clock. The control circuit 121 controls respective circuits by use of the memory 122 which stores programs and data, and encodes/decodes data.

Transmission data to be transmitted is processed by the control circuit 121, based on data obtained from outside by the external IF circuit 123. The transmission data is modulated by the modulator 105, to become a transmission signal, using a carrier wave generated by the carrier wave generator 106. This transmission signal is amplified by the transmitter 104, and transmitted to the transponders 2 via the transmit antenna 101.

A received signal received via the receive antenna 111 is amplified by the low noise amplifier 110, and is subjected to down conversion by the mixer 109, using a carrier wave generated by the carrier wave generator 106. Further, the signal is subjected to down conversion by the subcarrier wave detector 108, and is then transformed into received data by the demodulator 107. The received data is processed by the control circuit 121. The processed result is outputted from the external IF circuit to the outside.

Figure 3:
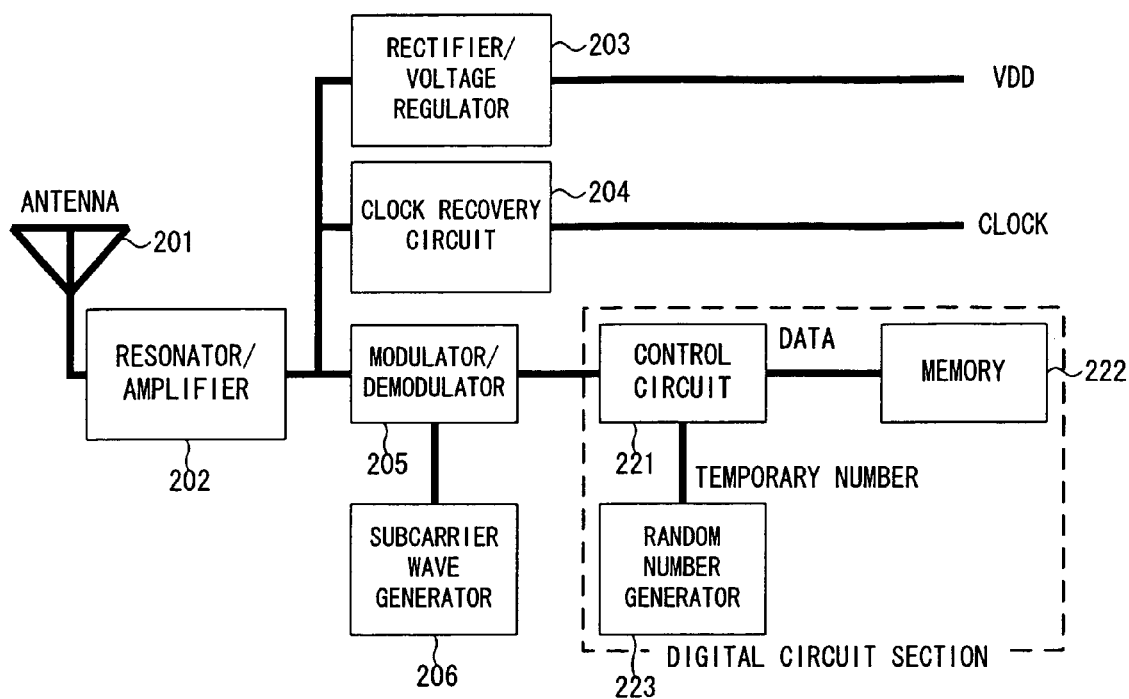
FIG. 3 is a block diagram showing an example of structure of a transponder according to the first embodiment.

Outline of the transponders 2 will be described next. FIG. 3 is a block diagram showing an example of configuration of a transponder according to the present embodiment. The transponder 2 has an antenna 201, a resonator/amplifier 202, a rectifier/voltage regulator 203, a clock recovery circuit 204, a modulator/demodulator 205, a subcarrier wave generator 206, a control circuit 221, a memory 222, and a random number generator 223. IDs specific to the transponders 2 are respectively set in advance.

A received signal received from the interrogator 1 by the antenna 201 is subjected to matching and amplification by the resonator/amplifier 202. This signal is then transformed into power supply by the rectifier/voltage regulator 203 and supplied to respective circuits. Further, from the received signal from the interrogator 1, a clock is extracted and supplied to respective circuits by the clock recovery circuit 204 as well. At first, a continuous wave is transmitted from the interrogator 1. Each of the transponders 2 generates power supply and a clock from the continuous wave, and is thereby activated. Thereafter, the received signal from the interrogator 1 is demodulated by the modulator/demodulator 205, using a subcarrier wave generated by the subcarrier wave generator 206. The demodulated signal is further processed by the control circuit 221, including being encoded/decoded data, and a result thereof is stored into the memory section 222.

The data processed by the control circuit 221 on the basis of the memory 222 or the random number generator 223 is modulated by the modulator/demodulator 205, using a subcarrier wave generated by the subcarrier wave generator 206. The modulated signal is subjected to matching/amplification by the resonator/amplifier 202, and transmitted to the interrogator 1 via the antenna 201.

The IDs as preset identification information of transponders, and temporary numbers generated by the random number generator 223 are stored as bit strings into the memory 222, and are read by instructions from the control circuit 221. The bit string length N of the temporary number is shorter than the length M of the ID bit string. The bit string of the temporary number is read for every unit bit string having a predetermined length, and is transmitted to the interrogator 1.

Operation of identification processing of a wireless communication system according to the present invention will be described. In the present embodiment, the length of the unit bit string is set to 1 bit. The priority order of unit bit strings is arranged in the order from "0" to "1".

Operation of the identification processing by the interrogator 1 will now be described.

Figure 4:
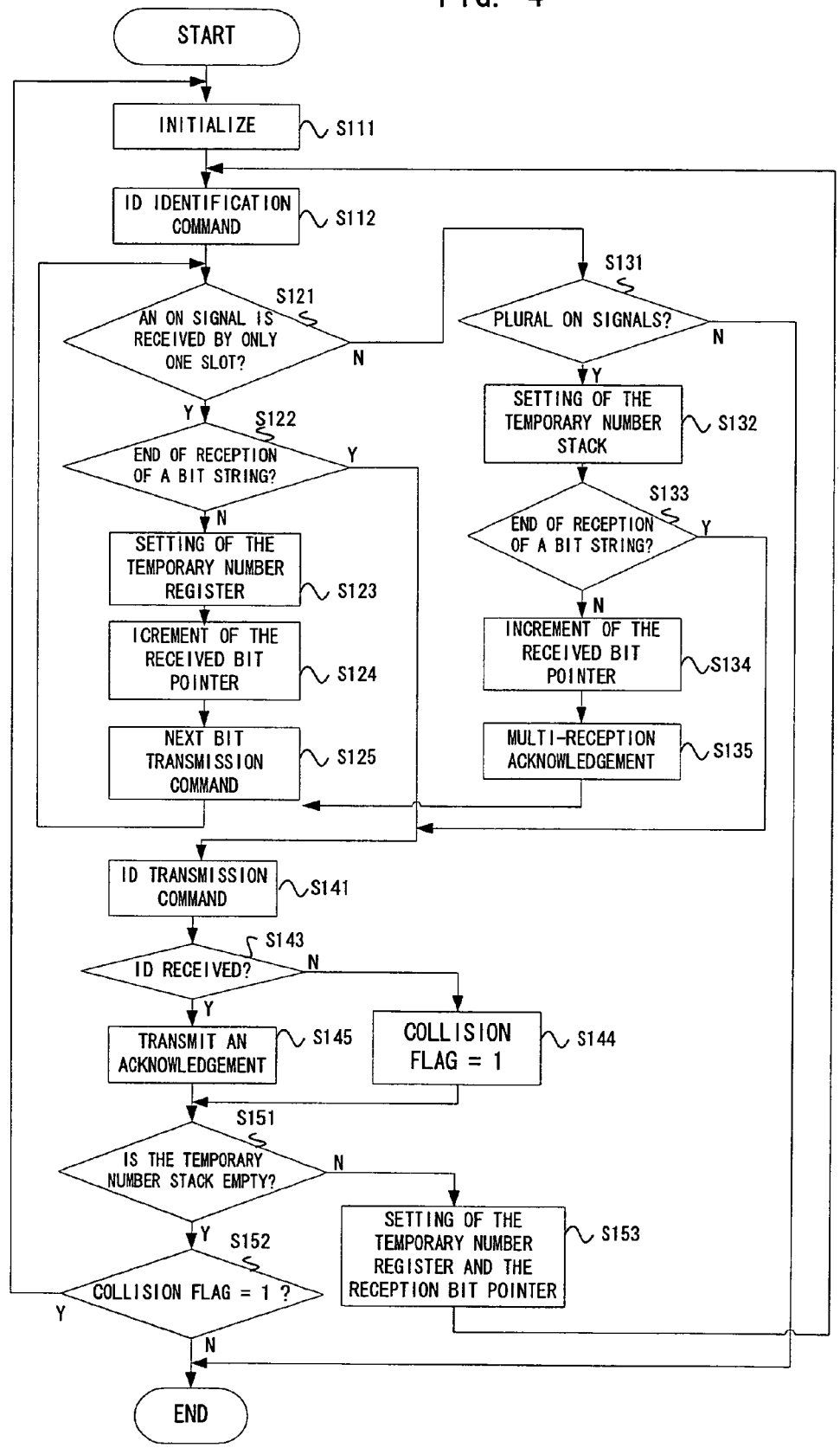
FIG. 4 is a flowchart showing an example of operation of identification processing performed by the interrogator according to the first embodiment.

FIG. 4 is a flowchart showing an example of operation of identification processing of the interrogator 1 according to the present embodiment. At first, the control circuit 121 initializes parameters (e.g., a temporary number stack, temporary number register, received bit pointer, and collision flag) in the memory 122 (S111). The temporary number register stores a temporary number bit string received. The temporary number stack stores temporary number bit strings under search. The received bit pointer is a pointer indicative of the position of the received unit bit string in a received temporary number bit string. The collision flag is turned on ("1") if an ID is not received normally.

Next, the control circuit 121 transmits an ID identification command ("Read_ID") to the transponders 2 (S112). Next, the control circuit 121 determines whether an ON signal has been received by only one of the slot no. 0 and the slot no. 1 (S121). If an ON signal is received by only one slot (S121,Y), the control circuit 121 determines whether reception of all bits of a temporary number bit string has been finished or not (S122). That is, the control circuit 121 determines whether the value of the received bit pointer is N or not. If the reception of all bits as mentioned above has been finished (S122, Y), the control circuit 121 goes to the processing step S141. Otherwise, if the reception mentioned above has not yet been finished (S122, N), the value of the slot number by which the ON signal has been received is set in the unit bit string indicated by the received bit pointer, in the value of the temporary number register (S123). The control circuit 121 raises the received bit pointer by a unit bit sting length (S124), and transmits a next-bit transmission command ("Read_Next") as a request for transmission of a next unit bit string, to the transponders 2 (S125). The control circuit 121 then returns to the processing step S121.

In the processing step S121, if the ON signal has not been received by only one slot (S121, N), the control circuit 121 determines whether the ON signal has been received by both of the slot no. 0 and the slot no. 1 or not (S131). That is, if the ON signal has not been received by any of the both slots (S131, N), i.e., if the ON signal has been received by none of these slots, there is no transponder 2 to identify, and this processing flow is terminated. Otherwise, if the ON signal is received by both of the slots (S131, Y), the control circuit 121 stacks a bit string which has already been stored in the temporary number register, together with another bit string of which the value of the unit bit string indicated by the received bit pointer is set to 1, into the temporary number stack (S132). More specifically, "0" is a predetermined unit bit string which is to be prioritized according to priority order of unit bit strings. Among received unit bit strings, "0" is stored at the position of the received bit pointer of the temporary number register. Also among the received unit bit strings, "1" is stored at the position of the received bit pointer of the temporary number stack. Next, the control circuit 121 determines whether reception of all bits of the temporary number bit string has been finished or not (S133). That is, the control circuit 121 determines whether the value of the received bit pointer is N or not.

If the reception of all bits as mentioned above has not yet been finished (S133, N), the control circuit 121 raises the received bit pointer by the length of a unit bit string (S134), and sends a multi-reception acknowledgement ("Read_Multi") to the transponder 2 (S135). The multi-reception acknowledgement indicates that plural kinds of unit bit strings have been received. The control circuit 121 then returns to the processing step S121.

In the processing step S133, if the reception has been finished (S133, Y), the control circuit 121 sends an ID transmission command ("Send_D") which requests transmission of an ID from the transponder 2 whose temporary number has been specified (S141). The control circuit 121 determines whether the ID from the transponder 2 in response to the ID transmission command has been received normally or not (S143). If the ID has not been received normally (S143, N), the control circuit 121 turns on the collision flag (S144), and goes to the processing step S151. Otherwise, if the ID has been received normally (S143, Y), the control circuit 121 sends an identification confirmation to the transponder 2 (S145), and goes to the processing step S151.

Next, the control circuit 121 determines whether the temporary number stack is empty or not (S151). If the temporary number stack is empty (S151, Y), the control circuit 121 determines whether the collision flag is on or not (S152). If the collision flag is off ("0") (S152, N), identification of the transponder 2 is regarded as having been finished, and this processing flow is terminated. Otherwise, if the collision flag is on (S152, Y), the processing flow returns to the processing step S111.

In the processing step S151, if the temporary number stack is not empty (S151, N), the control circuit 121 stores the newest bit string stored in the temporary number stack into the temporary number register, and returns the received bit pointer to a position next to the bit string of the temporary number register (S153). The control circuit 121 then returns to the processing step S112 and performs identification of another transponder 2.

Operation of the identification processing of transponders 2 will now be described.

Figure 5:
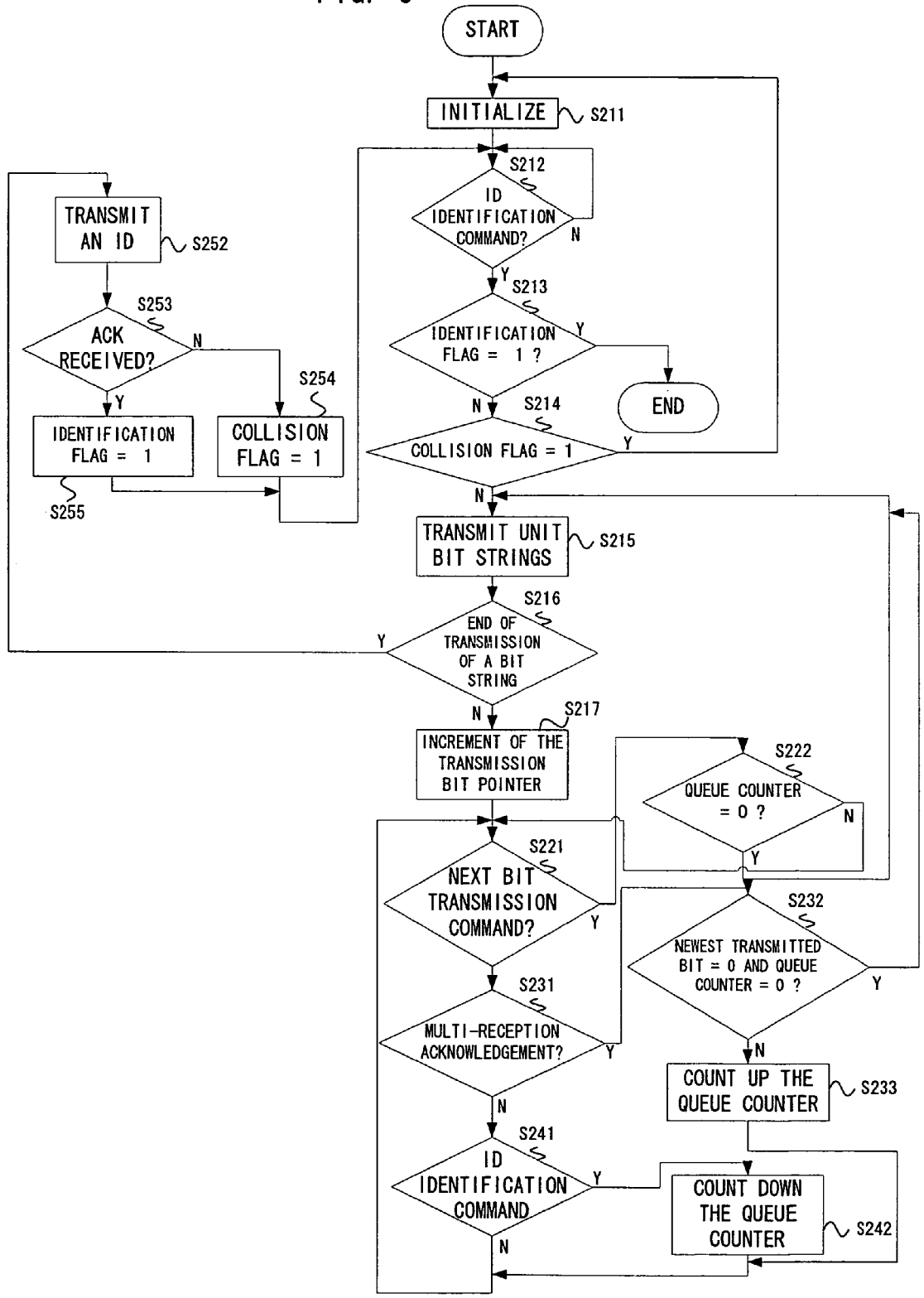
FIG. 5 is a flowchart showing an example of operation of identification processing performed by the transponder according to the first embodiment.

FIG. 5 is a flowchart showing an example of operation of the identification processing of the transponders according to the present embodiment. At first, the control circuit 221 of each of the transponders 2 that have been activated by a continuous wave from the interrogator 1 initializes parameters (a transmission bit pointer, queue counter, identification flag, and collision flag) (clears the parameters to "0") in the memory 222. Simultaneously, the control circuit 221 lets the random number generator 223 generate a temporary number bit string, and stores the generated bit string into the temporary number register in the memory 222 (S211). The temporary number bit string is transmitted in the order from LSB or MSB. The transmission bit pointer is a pointer indicating the position of a unit bit string which has been transmitted, of the temporary number bit string. The identification flag is turned on if ID identification is completed. The collision flag is turned on if transmission of an ID has not been achieved normally. A value is set in the queue counter, based on preset priority order of unit bit strings. The transponder 2 can transmit unit bit stings after the queue counter counts zero.

Next, the control circuit 221 determines whether an ID identification command ("Read_ID") has been received or not from the interrogator 1 (S212). If the ID identification command has not been received (S212, N), the control circuit 221 returns to the processing step S212. Otherwise, if the ID identification command has been received (S212, Y), the control circuit 221 determines whether the identification flag is on or not (S213). If the identification flag is on (S213, Y), this processing flow is terminated. Otherwise, if the identification flag is off ("0") (S213, N), the control circuit 221 determines whether the collision flag is on or not (S214). If the collision flag is on (S214, Y), the control circuit 221 returns to the processing step S211. Otherwise, if the collision flag is off (S214, N), the control circuit 221 sends an ON signal to a slot having a slot number equal to the value of the unit bit string which the transmission bit pointer points in the value of the temporary number register (S215). The control circuit 221 further determines whether transmission of all bits in the temporary number bit string has been finished or not (S216). That is, the control circuit 221 determines whether the value of the transmission bit pointer is N or not.

If transmission has not been finished (S216, N), the control circuit 221 raises the transmission bit pointer by the length of a unit bit string (S217), and determines whether a next bit transmission command ("Read_Next") has been received or not (S221). If a next bit transmission command has been received (S221, Y), the control circuit 221 determines whether the queue counter indicates zero (queue counter=0) or not (S222). If the queue counter indicates zero (S222, Y), the control circuit 221 returns to the processing step S215. Otherwise, if the queue counter does not indicate zero (S222, N), the control circuit 221 returns to the processing step S221.

In the processing step S221, if the next bit transmission command has not been received (S221, N), the control circuit 221 determines whether a multi-reception acknowledgement ("Read-Multi") has been received or not (S231). If the multi-reception acknowledgement has been received (S231, Y), the control circuit 221 determines whether the newest transmission unit bit string=0 and the queue counter=0 are satisfied or not (S232). If the newest transmission unit bit string=0 and the queue counter=0 are satisfied (S232, Y), the processing flow returns to the processing step S215. Otherwise, if the newest transmission unit bit string=0 and the queue counter=0 are not satisfied (S232, N), one is added to the count of the queue counter (S233), and the processing flow then returns to the processing step S221. That is, the unit bit string prioritized according to the predetermined priority order of unit bit strings is "0". Therefore, the control circuit 221 stands by with the queue counter made count up, if the transmission unit bit string is "1".

In the processing step S231, if the multi-reception acknowledgement has not been received (S231, N), the control circuit 221 determines whether an ID identification command has been received or not (S241). If an ID identification command has been received (S241, Y), the control circuit 221 subtracts one from the count of the queue counter, and returns to the processing step S221. If the ID identification command has not been received (S241, N), the control circuit 221 returns to the processing step S221.

In the processing step S216, if transmission has been finished (S216, Y), the control circuit 221 waits for an ID transmission command ("Send_ID") from the interrogator 1 (S255), and transmits the ID of the transponder 2 (S252). The control circuit 221 determines whether an identification acknowledgement ("Ack") has been received or not from the interrogator 1 (S253). If an ID reception response has not been received within a predetermined time (S253, N), the collision flag is set to ON (S254), and the processing flow goes to the processing step S212. Otherwise, if the ID reception response has been received (S253, Y), the control circuit 221 turns on the identification flag (S255), and goes to the processing step S212.

Next, the slots noted above will be described.

Figure 6:
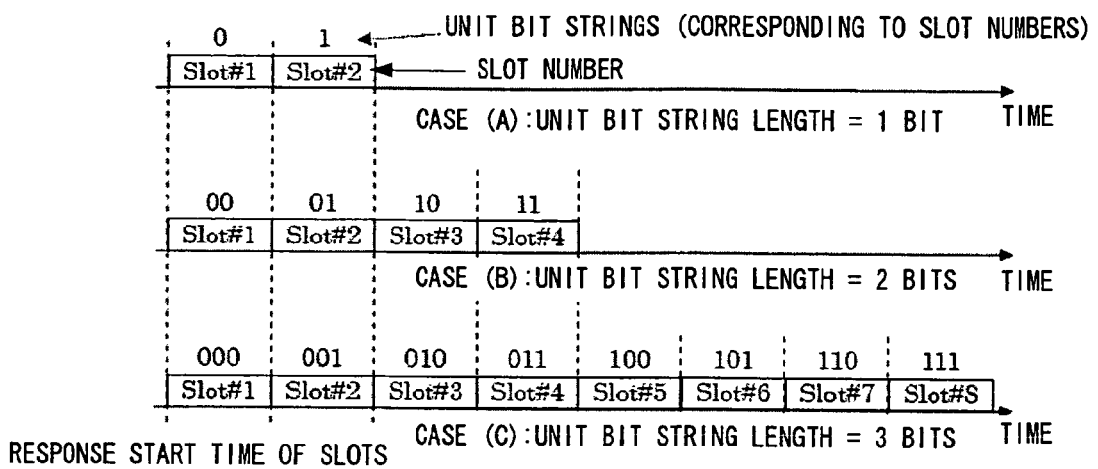
FIG. 6 is a timing chart showing an example of configuration of slots according to the first embodiment.
Figure 7:
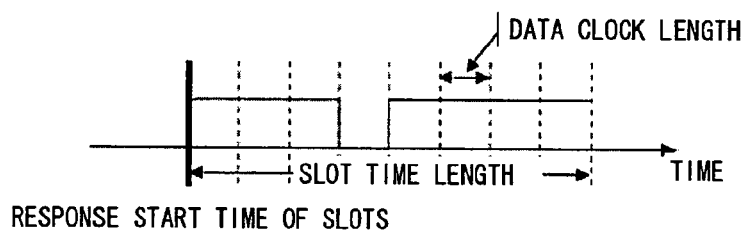
FIG. 7 is a timing chart showing an example of an ON signal in a slot according to the first embodiment.

FIG. 6 is a timing chart showing an example of configuration of slots according to the present embodiment. From the upside, the figure shows: a case (a) where the unit bit string (slot number) length=1 bit is given (the number of slots=2); another case (b) where the unit bit string length=2 bits is given (the number of slots=4); and yet another case (c) where the unit bit string length=3 bits (the number of slots=8). In the present embodiment, the number of slots=2 is given. The slot number corresponds to a transmission bit string which is included in a temporary number bit string and is transmitted one time. In the processing step S215, the transponder 2 transmits an ON signal to the slot corresponding to the transmission bit string. FIG. 7 is a timing chart showing an example of the ON signal at the slot in the present embodiment. This figure shows a waveform of the ON signal in case where the number of slots=8 and in case where the number of slots=4 (the unit bit string="011"). The ON signal is a signal having such a part in the slot that has a different level from a normal level.

Next, specification of a temporary number in the interrogator will be described.

Figure 8:
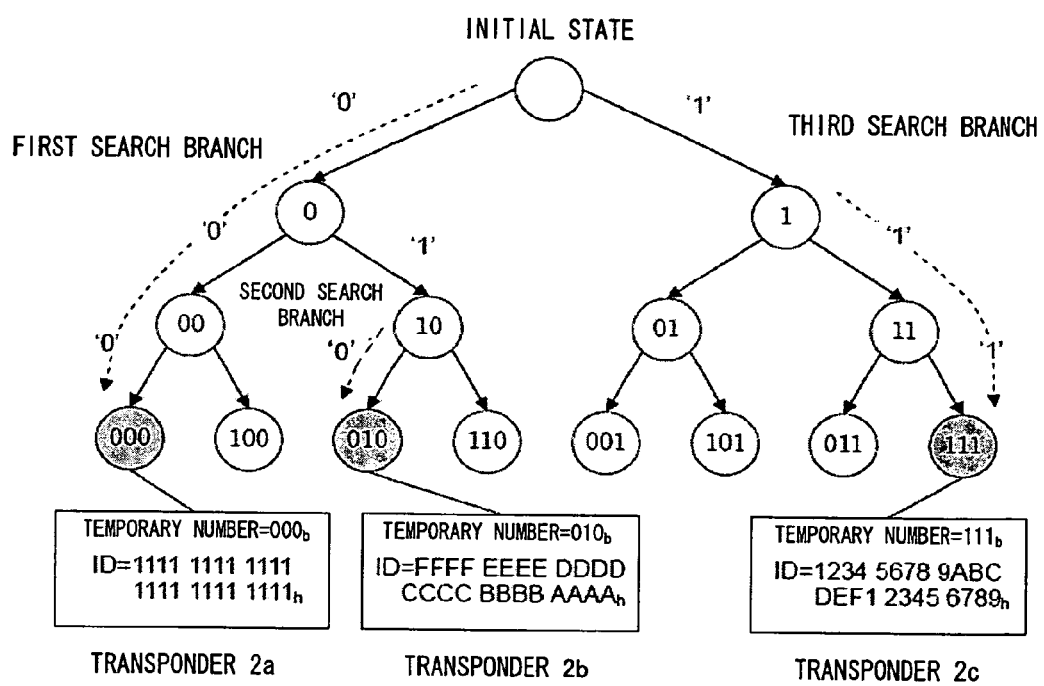
FIG. 8 shows a tree showing an example of particular operation of temporary numbers according to the first embodiment.

Suppose now that the length of a slot number=1 bit (the number of slots=2), the length of a temporary number bit string=3 bits, and the length of an ID bit string=96 bits. FIG. 8 is a tree showing an example of operation of specifying a temporary number, according to the present embodiment. This figure shows a case where the transponders 2a, 2b, and 2c are identified by the interrogator 1. The transponders 2a, 2b, and 2c respectively have "000", "010", and "111" as temporary numbers. If the interrogator 1 receives two values during a search for a temporary number, a temporary number is searched for with "0" prioritized, as described with reference to the processing flow S132. Each of states in search branches expresses the value of a temporary number register.

The control circuit 121 starts from a state where the temporary number register is empty, i.e., from the uppermost stage among search branches. In this state, if both of "0" and "1" are received from the transponders 2a, 2b, and 2c, "1" is stacked on the temporary number stack, and the value of the temporary number register is added with a prioritized "0", to become "0". In this state, if both of "0" and "1" are received from the transponders 2a and 2b, the value of the temporary number register is added with "1", to obtain "10" which is stacked on the temporary number stack. The value of the temporary number register is added with a prioritized "0", to become "00". In this state, if "0" is received from the transponder 2a, the value of the temporary number register is added with "0", to become "000". At this time, the control circuit 121 completes specification of the temporary number "000" of the transponder 2a, and subsequently carries out reception of the ID of the transponder 2a.

Next, the control circuit 121 sets "10", which is the newest value of the temporary number stack, as the value of the temporary number register. In this state, if "0" is received from the transponder 2b, the value of the temporary number register is added with the received "0" and becomes "010". Then, the control circuit 121 completes specification of the temporary number "010" of the transponder 2b, and subsequently receives the ID from the transponder 2b.

The control circuit 121 then takes "1", which is a next value of the temporary number stack, as the value of the temporary number register. In this state, if "1" is received from the transponder 2c, the value of the temporary number register is added with "1" to become "11". In this state, if "1" is received from the transponder 2c, the value of the temporary number register is added with the received "1", to become "111". Then, the control circuit 121 completes specification of the temporary number "111" of the transponder 2c, and subsequently receives the ID from the transponder 2c. Thus, ID identification is completed for all transponders.

That is, the interrogator 1 receives plural kinds of unit bit strings, and stacks a non-prioritized bit string on the temporary number stack. The temporary number of a prioritized transponder is specified, and an ID is received. Thereafter, from the bit string on the temporary number stack, specification of another temporary number is started again. As a result, temporary number bit stings need not be received for every transponder from the beginning of temporary number bit strings. Time required for identification processing can be shortened.

As described above, a temporary number which is shorter information than an ID is used to decide priority order for ID identification. After specifying a temporary number, identification of an ID is carried out. Therefore, time required for the identification processing can be reduced. The transponder 2 prevents collision by setting the queue counter of itself based on a transmission unit bit string and a predetermined priority order. In addition, the interrogator 1 need not inquire of the transponders 2 about temporary numbers or IDs. Therefore, time for identification processing can be reduced. Further, the interrogator 1 receives plural kinds of unit bit strings from the transponders 2, distinguishing the plural kinds of unit bit strings from one another. In addition, the interrogator 1 stacks a particular intermediate temporary number other than the most prioritized temporary number. Thereafter, specification of the temporary numbers is carried out again from the intermediate number. In this fashion, temporary numbers other than the most prioritized one need not be received again from the beginning. As a result, time for identification processing can be reduced.

Second Embodiment

In the above-described first embodiment, the length of a unit bit string=1 bit is given. However, the present embodiment will be described with reference to a case of setting the length of a unit bit string to two bits or more. For example, the length of a unit bit string is set to two bits, and the priority order of unit bit strings is arranged in the order of "00", "01", "10", and "11".

Operation of identification processing in the interrogator 1 will be described first.

Figure 9:
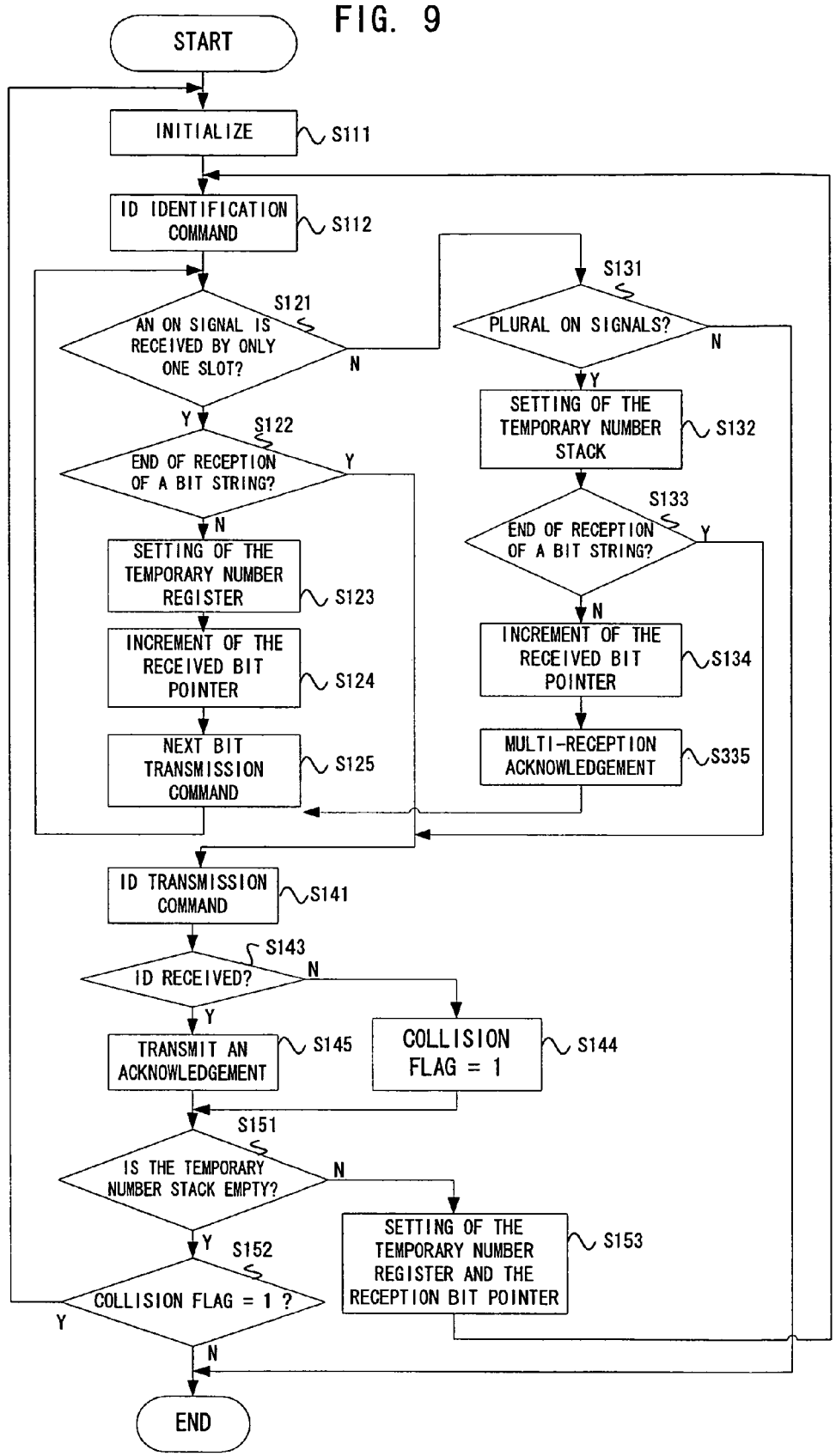
FIG. 9 is a flowchart showing an example of operation of identification processing performed by an interrogator according to the second embodiment.

FIG. 9 is a flowchart showing an example of operation of identification processing of the interrogator 1 according to the present embodiment. The same reference symbols as those in FIG. 4 denote the same as or equivalents to the elements shown in FIG. 4. A description thereof will be omitted herefrom. Compared with FIG. 4, the processing step S335 in FIG. 9 is executed in place of the processing step S135. In the processing step S335, the control circuit 121 decides the most prioritized unit bit string among received plural unit bit strings, based on predetermined priority order of unit bit strings. The control circuit 121 makes the decided unit bit string included as the most prioritized unit bit string in a multi-reception acknowledgement, and sends this unit bit string to the transponder 2. As a result, the other received unit bit strings of a temporary number bit string than the most prioritized unit bit string are stacked on the temporary number stack, and the temporary number bit string added with the most prioritized unit bit string is stored in the temporary number register.

Next, operation of the identification processing in the transponder 2 will now be described.

Figure 10:
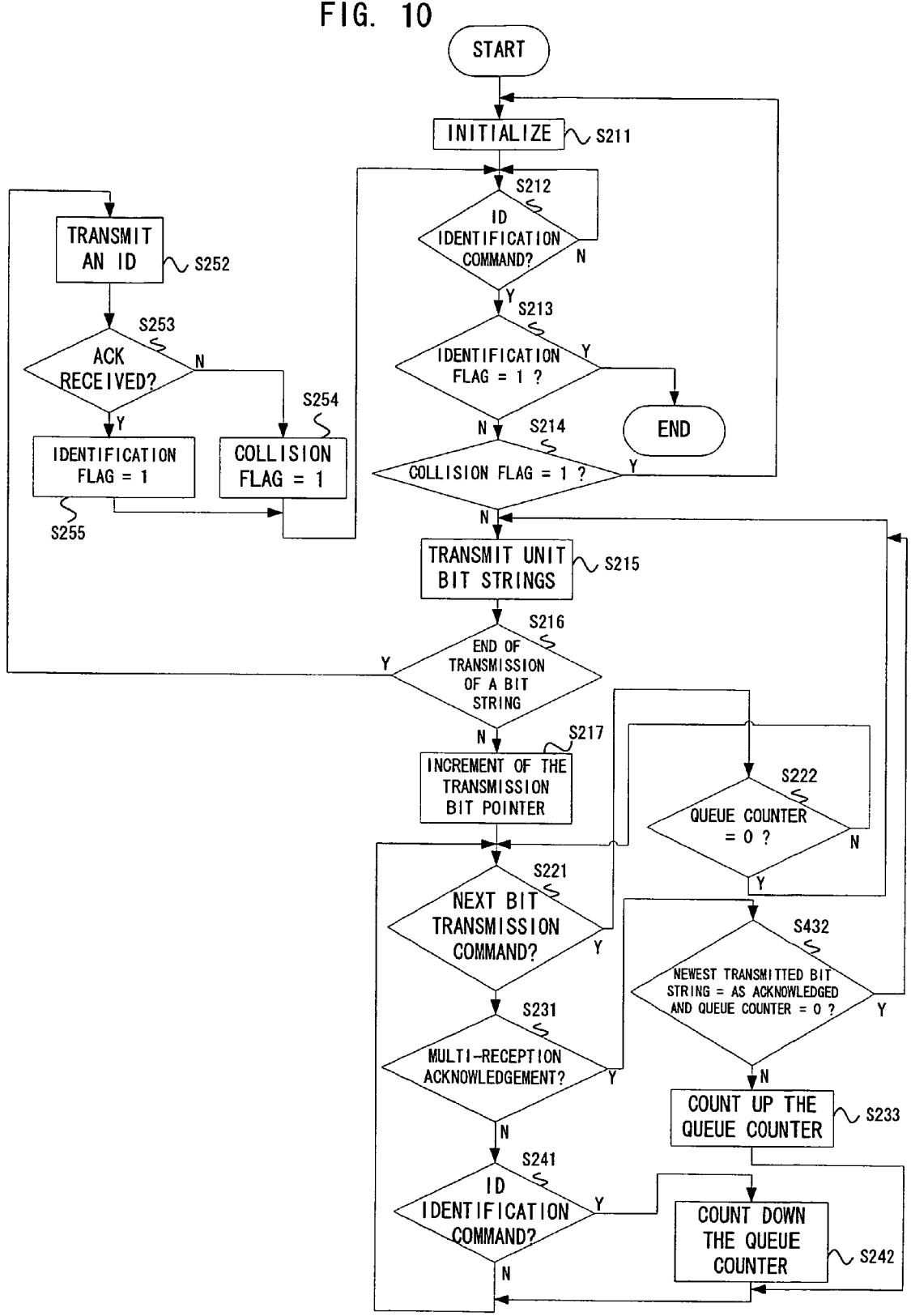
FIG. 10 is a flowchart showing an example of operation of identification processing performed by a transponder according to the second embodiment.

FIG. 10 is a flowchart showing an example of operation of the identification processing in the transponder 2 according to the present embodiment. The same reference symbols as those in FIG. 5 denote the same as or equivalents to the elements shown in FIG. 5. A description thereof will be omitted herefrom. Compared with FIG. 5, the processing step S432 in FIG. 10 is executed in place of the processing step S232. In the processing step S432, the control circuit 221 determines whether or not the newest transmission unit bit string is the most prioritized unit bit sting included in the multi-reception acknowledgement and simultaneously the queue counter=0 is satisfied. As a result, the transponder 2 which has a transmission unit bit string other than the most prioritized unit bit string increases the count of a standby time counter and waits.

As described above, the interrogator 1 sends a multi-reception acknowledgement to the transponder 2, with the most prioritized unit bit string included in the acknowledgement. The transponder 2 performs setting of the queue counter of itself, based on the most prioritized unit bit string included in the multi-reception acknowledgement and the transmission unit bit string. As a result, even if the length of a unit bit string is two bits or more, the queue counter can be set appropriately.

The transponders according to the embodiments described above may include, for example, transponders, tags, IC cards, and the like. The interrogator according to the present embodiment may include, for example, interrogators, readers/writers, and the like.

A temporary number specify section and an identification information obtaining section correspond to the control circuit 121 in the embodiments. A temporary number generation section corresponds to the random number generator 223 in the embodiments. A unit bit string transmitter and an identification information transmitter correspond to the control circuit 221 in the embodiments.

Further, a temporary number specify step, a unit bit string transmission request step, an identification information transmission step and an identification information reception step correspond to processing performed by the control circuit 121 in the embodiments. A temporary number generation step corresponds to processing performed by the random number generator 223 in the embodiments. A unit bit string transmission step and the identification information transmission step correspond to processing performed by the control circuit 221 in the embodiments.

What is claimed is:

1. An interrogator that makes wireless communication with a plurality of transponders, comprising:
    a temporary number specify section transmitting to the plurality of transponders a request for transmission of an ON signal, the temporary number specify section receiving the ON signal from a transponder among the plurality of transponders in response to the request for transmission of an ON signal, the ON signal indicating a unit bit string having a predetermined length in a bit string of a temporary number generated by the transponder, the ON signal being transmitted within a time slot corresponding to the unit bit string, the temporary number specify section specifying a portion of the bit string of the temporary number based on the ON signal, the temporary number specify section repeating specifying the portion of the bit string of the temporary number based on preset priority order of plural kinds of unit bit strings until the entire bit string of the temporary number is specified; and
    an identification information obtaining section transmitting, when the entire bit string of the temporary number is specified, a request for transmission of identification information to the transponder, the identification information obtaining section receiving the identification information transmitted from the transponder in response to the request for transmission of the identification information,
    wherein when the temporary number specify section receives a plurality of ON signals respectively transmitted from the plurality of transponders in response to the request for transmission of the ON signal, the interrogator selects the most prioritized unit bit string from among the plural kinds of unit bit strings respectively indicated by the plurality of ON signals based on the preset priority order and transmits a multi-reception acknowledgement including the selected unit bit string to the plurality of the transponders,
    when the multi-reception acknowledgement is received by the transponder and the unit bit string indicated by the transmitted ON signal is different from the selected unit bit string, the multi-reception acknowledgement causes the transponder to increase a standby time to a transmission of a next ON signal to the interrogator, and
    when the multi-reception acknowledgement is received by the transponder, when the unit bit string indicated by the transmitted ON signal is the selected unit bit string, and when the standby time is zero, the multi-reception acknowledgement causes the transponder to transmit the next ON signal to the interrogator.

2. The interrogator according to claim 1, wherein the temporary number specify section distinguishes the plurality of ON signals indicating the plural kinds of unit bit strings transmitted from the plurality of the transponders respectively.

3. The interrogator according to claim 1, wherein the temporary number specify section completes the entire bit string of the temporary number by connecting a plurality of unit bit strings indicated by ON signals transmitted from the transponder.

4. The interrogator according to claim 1, wherein when the plurality of ON signals respectively indicating the plural kind unit bit strings are received by the interrogator, the temporary number specify section determines priority order of the plural kinds of unit bit strings based on the preset priority order, generates a first bit string by connecting the portion of the bit string of the temporary number with the unit bit string different from the most prioritized unit bit string among the plural kinds of unit bit strings, stores the first bit string in a temporary number stack, generates a second bit string of a temporary number by connecting the portion of the bit string of the temporary number with the most prioritized unit bit string, and stores the second bit string.

5. The interrogator according to claim 1, wherein if the identification information is received by the identification information obtaining section and if a bit string is stored in a temporary number stack, the temporary number specify section repeats specifying the portion of the bit string of the temporary number by using the newest bit string stored in the temporary number stack.

6. The interrogator according to claim 1, wherein the length of the bit string of the temporary number is shorter than the length of a bit string of the identification information.

7. A transponder that makes wireless communication with an interrogator, comprising:
   a temporary number generation section that generates a temporary number;
   an ON signal transmitter that transmits an ON signal in response to a request for transmission of the ON signal from the interrogator, the ON signal indicating a unit bit string having a predetermined length in a bit string of the temporary number, the ON signal being transmitted within a time slot corresponding to the unit bit string; and
   an identification information transmitter that transmits, in response to a request for transmission of identification information from the interrogator, the identification information to the interrogator,
   wherein when a plurality of ON signals are respectively transmitted from a plurality of transponders including the transponder in response to the request for transmission of the ON signal, the most prioritized unit bit string is selected from among plural kinds of unit bit strings respectively indicated by the plurality of ON signals based on preset priority order of the plural kinds of unit bit strings by the interrogator and a multi-reception acknowledgement including the selected unit bit string is transmitted by the interrogator,
   when the multi-reception acknowledgement is received by the transponder and the unit bit string indicated by the ON signal transmitted by the ON signal transmitter is different from the selected unit bit string, the ON signal transmitter increases a standby time to a transmission of a next ON signal to the interrogator, and
   when the multi-reception acknowledgement is received by the transponder, when the unit bit string indicated by the transmitted ON signal is the selected unit bit string, and when the standby time is zero, the ON signal transmitter transmits the next ON signal to the interrogator.

8. The transponder according to claim 7, wherein if the ON signal transmitter receives a multi-reception acknowledgement from the interrogator and the unit bit string transmitted by the transponder is different from the selected unit bit string, the ON signal transmitter sets a queue counter for the standby time, based on the ON signal transmitted from the transponder and based on the preset priority order.

9. The transponder according to claim 8, wherein the ON signal transmitter receives a multi-reception acknowledgement or a request for transmission of an additional ON signal indicating a next unit bit string, from the interrogator, and transmits the additional ON signal indicating the next unit bit string if the queue counter indicates zero.

10. The transponder according to claim 7, wherein the length of the bit string of the temporary number is shorter information than the length of a bit string of the identification information.

11. A transponder identification method by wireless communication between an interrogator and a plurality of transponders, comprising:
   generating a plurality of temporary numbers by the plurality of transponders respectively;
   transmitting from the interrogator to the plurality of transponders a request for transmission of an ON signal;
   transmitting the ON signal from a transponder among the plurality of transponders to the interrogator in response to the request for transmission of the ON signal, the ON signal indicating a unit bit string having a predetermined length in a bit string of a temporary number generated by the transponder, the ON signal being transmitted within a time slot corresponding to the unit bit string;
   specifying a portion of the bit string of the temporary number by the interrogator based on the ON signal;
   repeating specifying the portion of the bit string of the temporary number based on preset priority order of plural kinds of unit bit strings by the interrogator until the entire bit string of the temporary number is specified;
   transmitting a request for transmission of identification information from the interrogator to the transponder when the entire bit string of the temporary number is specified by the interrogator;
   transmitting the identification information from the transponder to the interrogator in response to the request for transmission of the identification information; and
   receiving the identification information by the interrogator,
   wherein when a plurality of ON signals are respectively transmitted from a plurality of transponders in response to the request for transmission of the ON signal, the interrogator selects the most prioritized unit bit string among the plural kinds of unit bit strings respectively indicated by the plurality of ON signals based on the preset priority order and transmits a multi-reception acknowledgement including the selected unit bit string to the plurality of the transponders,
   when the multi-reception acknowledgement is received by the transponder and the unit bit string indicated by the transmitted ON signal is different from the selected unit bit string, the transponder increases a standby time to a transmission of a next ON signal to the interrogator, and
   when the multi-reception acknowledgement is received by the transponder, when the unit bit string indicated by the transmitted ON signal is the selected unit bit string, and when the standby time is zero, the ON signal transmitter transmits the next ON signal to the interrogator.

12. The transponder identification method according to claim 11, wherein the interrogator distinguishes the plurality of ON signals indicating the plural kinds of unit bit strings transmitted from the plurality of the transponders respectively.

13. The transponder identification method according to claim 11, wherein the interrogator completes the entire bit string of the temporary number by connecting a plurality of unit bit strings indicated by ON signals transmitted from the transponder.

14. The transponder identification method according to claim 11, wherein when the plurality of ON signals respectively indicating the plural kind unit bit strings are received by the interrogator, the interrogator determines priority order of the plural kinds of unit bit strings based on the preset priority order, generates a first bit string by connecting the portion of the bit string of the temporary number with the unit bit string different from the most prioritized unit bit string among the plural kinds of unit bit strings, stores the first bit string in a temporary number stack, and generates a second bit string of a temporary number by connecting the portion of the bit string of the temporary number with the most prioritized unit bit string, and stores the second bit string.

15. The transponder identification method according to claim 14, wherein if the identification information is received by the interrogator and if a bit string is stored in a temporary number stack, the interrogator repeats specifying the portion of the bit string of the temporary number by using the newest bit string stored in the temporary number stack.

16. The transponder identification method according to claim 15, wherein if the multi-reception acknowledgement is transmitted from the interrogator and the unit bit string transmitted by the transponder is different from the most prioritized unit bit string, the transponder sets a queue counter for the standby time, based on the ON signal transmitted from the transponder and based on the preset priority order.

17. The transponder identification method according to claim 16, wherein when the respective transponders receive a multi-reception acknowledgement or a request for transmission of an additional ON signal indicating a next unit bit string, from the interrogator, the transponder transmits the additional ON signal indicating the next unit bit string if the queue counter indicates zero.

* * * * *